United States Patent [19]

Toshikuni et al.

[11] Patent Number: 4,804,056

[45] Date of Patent: Feb. 14, 1989

[54] FRAME TYPE TRACTOR

[75] Inventors: Nobuyuki Toshikuni, Neyagawa; Masao Takagi, Hashimoto; Nobuyuki Nishiguchi, Sakai, all of Japan

[73] Assignee: Kubota Limited, Osaka, Japan

[21] Appl. No.: 110,816

[22] Filed: Oct. 21, 1987

[30] Foreign Application Priority Data

Dec. 22, 1986 [JP] Japan .................. 61-197167
Jul. 21, 1987 [JP] Japan .................. 62-182813
Aug. 7, 1987 [JP] Japan .................. 62-198830

[51] Int. Cl.$^4$ .............................................. B60K 20/00
[52] U.S. Cl. ...................................... 180/70.1; 180/900
[58] Field of Search .............. 180/53.1, 53.8, 70.1, 180/900

[56] References Cited

U.S. PATENT DOCUMENTS

| | | | |
|---|---|---|---|
| 2,416,640 | 2/1947 | Pinardi et al. | 180/900 |
| 3,063,308 | 11/1962 | Wayman | 180/70.1 |
| 3,216,104 | 11/1965 | O'Shields | 180/53.1 |
| 3,266,590 | 8/1966 | Hungerford | 180/53.1 |
| 4,126,201 | 11/1978 | Stevens | 180/70.1 |

Primary Examiner—David M. Mitchell
Assistant Examiner—Ross Weaver
Attorney, Agent, or Firm—Edwin E. Greigg

[57] ABSTRACT

A frame type tractor comprising an engine mounted on a forward region of a body frame, and a transmission mounted on a rear region of the body frame and operatively connected to the engine through a transmission shaft. The transmission consists of an input section, a change speed section and an output section. The input section includes an input shaft connected to the transmission shaft, a wet type multidisk clutch for establishing and breaking transmission of a engine drive received from the input shaft, and an oil pump driven by the input shaft.

8 Claims, 4 Drawing Sheets

FRAME TYPE TRACTOR

BACKGROUND OF THE INVENTION (1) Field of the Invention

The present invention relates to a frame type tractor, particularly an agricultural tractor, comprising an engine mounted on a forward region thereof and a transmission mounted on a rear region, the engine and transmission being interconnected by a body frame, and the transmission being driven by the engine through a transmission shaft.

(2) Description of the Prior Art

Generally, this type of tractor employs a dry type clutch for establishing and breaking drive transmission from the engine to the transmission. This clutch comprises large disks and its housing is also large in order to realize a high cooling efficiency and a strong frictional force. For mounting the large clutch housing a region in the rear of the engine is selected in which a larger accommodating space is available than adjacent the transmission case. One known example of such arrangement is disclosed in U.S. Pat. No. 4,513,834.

However, the following problem arises from the clutch housing being mounted in the region rearwardly of the engine. The tractor normally comprises an actuator for driving a working implement attached thereto, for example, a hydraulic cylinder for raising and lowering the working implement. The hydraulic cylinder receives pressure oil from a pump which must be operable independently of other working situations of the tractor. Therefore, the power for driving the pump is taken from a position not under the influence of a power transmission break effected by the clutch. That is to say the pump is mounted between the engine and the clutch. This position, however, is near the engine and is subjected to intense vibrations. This necessitates use of an expensive flexible pipe for connecting the pump to the components fixed to the body frame such as the transmission case containing oil and the hydraulic cylinder. Further, a considerable pressure loss occurs because the pipe has a large length, which results in disadvantages in terms of economy and performance.

SUMMARY OF THE INVENTION

Having regard to the above-noted state of the art, the object of the present invention is to provide a frame type tractor comprising an engine and a clutch having a good distance therebetween without any problem arising from such a spaced positional relationship between the engine and the clutch.

In order to achieve this object, a frame type tractor according to the present invention comprises at least one pair of drive wheels, a body frame, an engine mounted on a forward region of the body frame, a transmission shaft connected at an end thereof to an output shaft of the engine, and a transmission mounted on a rear region of the body frame, the transmission having an input section including an input shaft connected to the other end of the transmission shaft and a wet type multidisk clutch for establishing and breaking transmission of a drive received from the transmission shaft through the input shaft, a change speed section for changing a speed of the drive received from the input section, and an output section for transmitting the drive received from the change speed section to the drive wheels.

The wet type multidisk clutch has a high cooling capacity and, since its housing is small, may be mounted in an end wall region of the transmission case. In the above construction the drive is transmitted from the engine to the transmission through the transmission shaft and the clutch.

In a preferred embodiment of the invention, the input section further includes an oil pump driven by the input shaft. According to this construction, the pump may be mounted on the body frame adjacent the hydraulic cylinder and transmission case. Consequently, the pump is subjected to a reduced degree to engine vibrations, and an ordinary, short pipe is adequate for connecting the pump to the fixed elements such as the hydraulic cylinder and transmission.

According to a further preferred embodiment of the invention, the type multidisk clutch comprises a main clutch body and a clutch case housing the main clutch body, the main clutch body including a clutch housing defining a clutch input section, a clutch output shaft, and a friction disk mechanism. The oil pump and the clutch case define a space therebetween surrounded by a clutch case lid member to provide an oil chamber, the input shaft being supported by the clutch case lid member and carrying a lubricating oil pump on a portion thereof located in the oil chamber, and a lubricating oil passage being provided to supply oil from the oil chamber to the friction disk mechanism through the clutch output shaft. In this construction, the lubricating oil passage is defined by utilizing the lid member and the clutch output shaft for supplying lubricating oil to the friction disk mechanism in order to avoid an early deterioration of the friction disk mechanism due to frictional heat. This dispenses with an oil piping for supplying the lubricating oil.

Other object and advantages of the present invention will be apparent from the following description.

DESCRIPTION OF THE PREFERRED EMBODIMENT

Figure 1:
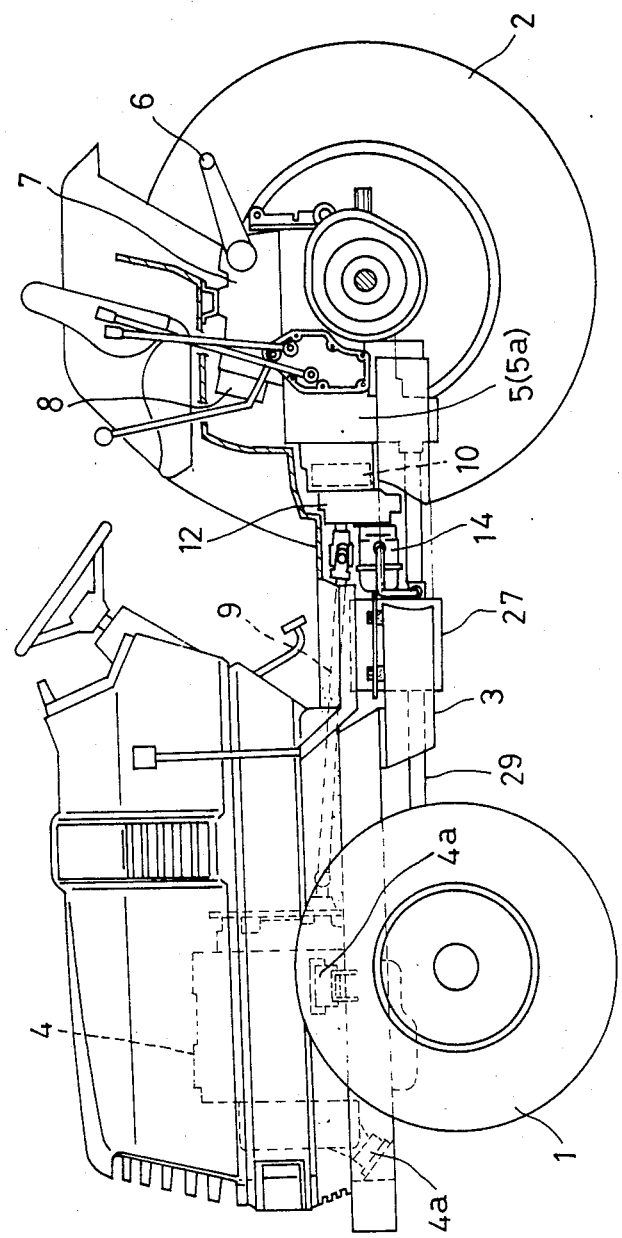
FIG. 1 is a side elevation of a frame type tractor according to the present invention.

As shown in FIG. 1, a tractor according to this invention comprises front wheels 1, rear wheels 2, and a body frame 3 carrying an engine 4 on a front region thereof through rubber cushions 4a acting as vibration absorber and a transmission case 5a housing a transmission 5 on a rear region of the body frame 3. The transmission 5 is operatively connected to the engine 4 through a transmission shaft 9. The transmission 5 comprises an input section including a wet type multidisk clutch 10 acting as main clutch, a change speed section for changing the speed of drive received from the input section, and an output section for transmitting the drive received from the change speed section to the front wheels 1 and rear wheels 2.

Figure 2:
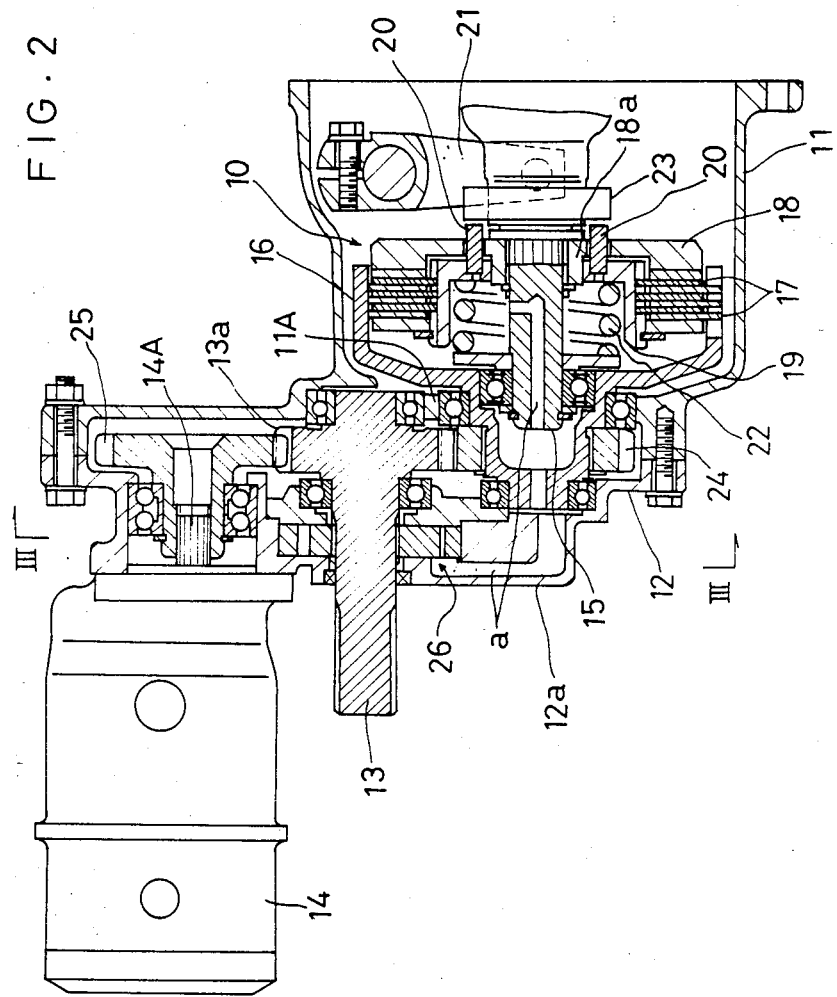
FIG. 2 is a sectional view of an input portion of a transmission with an input shaft, a pump drive shaft and a clutch output shaft shown as developed.

Referring to FIG. 2, the input section disposed in a forward part of the transmission case 5a includes a clutch case 11 containing a body of the main clutch 10, and a lid member 12 attached to a front face of the clutch case 11. The lid member 12 supports an input shaft 13 for receiving the drive from the engine 4. The input shaft 13 includes a drive gear 13a formed integrally with a portion thereof inside the lid member 12. An oil pump 14 is attached to the lid member 12 below the input shaft 13 for supplying pressure oil to a hydraulic cylinder 7. The oil pump 14 has a drive shaft 14A carrying an input gear 25 meshed with the drive gear 13a, whereby the engine drive is used upstream of the main clutch 10 for driving the oil pump 14. The oil pump 14 uses oil contained in an oil tank 27 mounted immediately forwardly thereof as the pressure oil.

Figure 3:
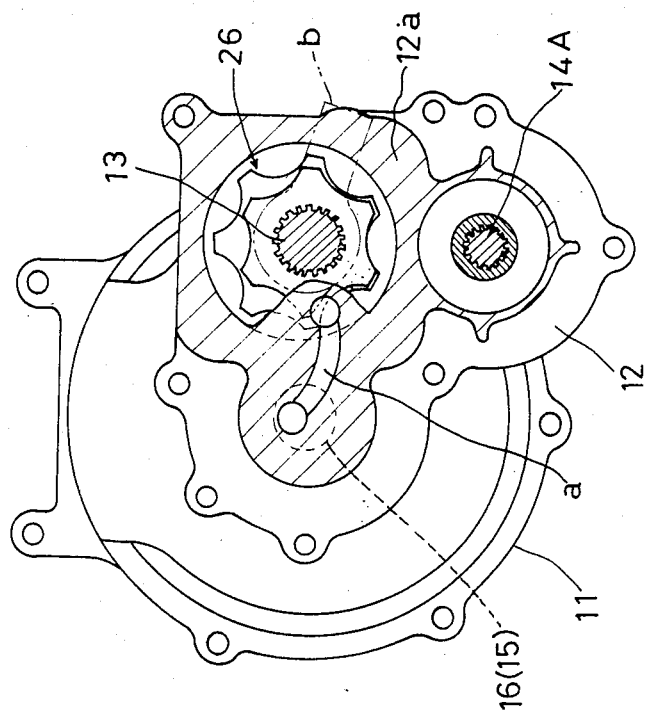
FIG. 3 is a section taken on line III—III of FIG. 2.

The construction of main clutch 10 will be described in detail with reference to FIGS. 2 and 3. A clutch output shaft 15 is disposed laterally of the input shaft 13 and supported through bearings by a support portion 11A in the clutch case 11, and a clutch housing 16 is rotatably mounted on a forward end of the output shaft 15. A backing plate 18 is mounted on the output shaft 15 at an open end of the clutch housing 16 to be rotatable with the output shaft 15 but not movable axially thereof for backing friction disks 17. The friction disks 17 are mounted in an interior space defined by the backing plate 18 and the clutch housing 16. The friction disks 17 are supported peripherally of a piston 19 mounted on a boss 18a of the backing plate 18 to be slidable back and forth axially of the output shaft 15 relative to the backing plate 18. The piston 19 includes engaging pins 20 extending axially of the output shaft 15 through the backing plate 18 to project into the other side of the backing plate 18. The engaging pins 20 cause the backing plate 18 and piston 19 to rotate in unision while permitting relative sliding movements therebetween axially of the output shaft 15. The friction disks 17 and adjacent elements are collectively called herein a friction disk mechanism.

At free ends of the engaging pins 20 there is a slide member 23 mounted on the output shaft 15 to be slidable axially thereof relative to the support portion 11A of the clutch case 11. The slide member 23 is movable by a main clutch shift fork 21 into contact with the engaging pins 20, thereby to move the piston 19 in a declutching direction against the force of a spring 22.

The clutch housing 16 carries a transmission gear 24 in constant mesh with the transmission gear 13a of input shaft 13, through which the clutch receives the engine drive. When the shift fork 21 is in a clutch engaging position, the force of spring 22 places the piston 19 at a position close to the backing plate 18 to engage the main clutch 10. Then the drive is transmitted from the clutch housing 16 to the output shaft 15 through the friction disks 17, piston 19 and backing plate 18.

The multidisk type main clutch 10 receives lubricating oil from a trochoidal hydraulic pump 26 mounted on and driven by the input shaft 13 and inwardly of a wall 12a of lid member 12. Thus the wall 12a of lid member 12 is used also as a pump casing. The lubricating oil is drawn from a bottom of the transmission case 5a through an external oil piping to an oil inlet b. To supply this lubricating oil to the main clutch 10, a lubricating oil supply passage a extends from inside the wall 12a of lid member 12 through the clutch case 11 and output shaft 15 into an interior space of the piston 19.

Figure 4:
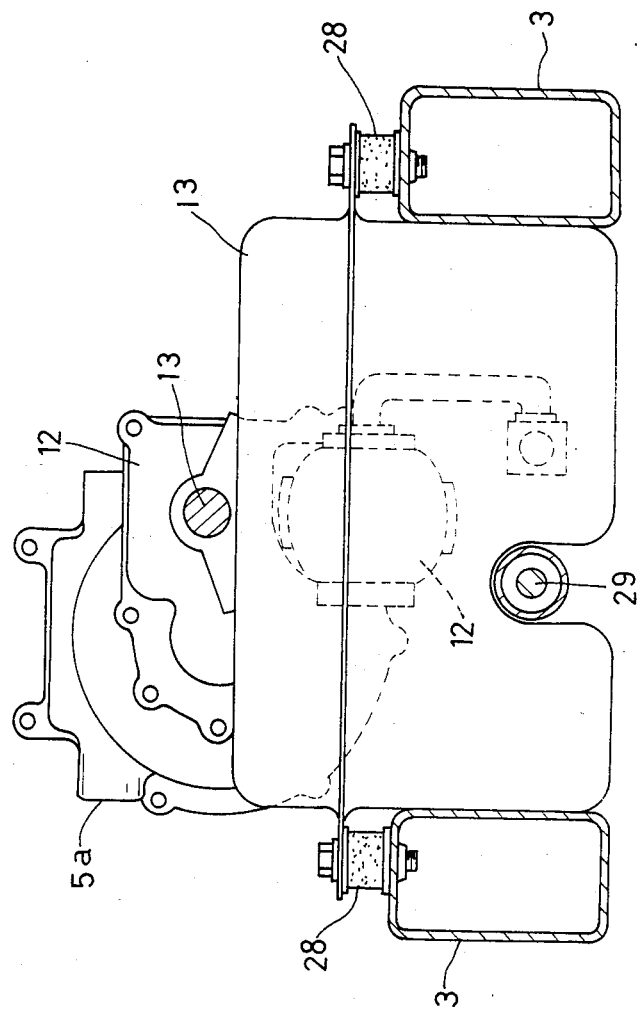
FIG. 4 is a sectional front view of a region adjacent an oil tank.

As shown in FIGS. 1 and 4, the oil tank 27 is mounted on the body frame 3 through rubber cushions 28 at a position forwardly of the pump 14. The pressure oil in the oil tank 27 is delivered by the pump 14 to the hydraulic cylinder 7 through an electromagnetic valve 8. Number 29 indicates a front wheel drive shaft extending through a recess formed in a bottom wall of the tank 27.

What is claimed is:

1. A frame type tractor comprising:
   at least one pair of drive wheels,
   a body frame,
   an engine mounted on a forward region of the body frame,
   an engine output shaft extending from said engine,
   an input shaft connected at one end thereof to said output shaft of said engine and including a drive gear on one end thereof, and
   a transmission mounted on a rear region of said body frame, said transmission including;
   an input section including a transmission drive gear driven by said input shaft, and a wet type multidisk clutch, said input shaft being connected to one end of said engine output shaft and said drive gear drives said transmission drive gear, said wet type multidisk clutch establishing and breaking transmission of a drive received from said transmission gear through said input shaft, a wet type multidisk clutch input member driven by said transmission drive gear and a wet type multidisk clutch output member providing a drive from said multidisk clutch to a clutch output shaft disposed laterally of said input shaft,
   a change speed section for changing a speed of the drive received from said input section, and
   an output section for transmitting the drive received from said change speed section to the drive wheels.

2. A frame type tractor as claimed in claim 1 wherein said wet type multidisk clutch input member is formed as a clutch housing of the clutch.

3. A frame type tractor as claimed in claim 2 wherein said input section of the transmission includes an oil pump driven by said drive gear mounted on the input shaft.

4. A frame type tractor as claimed in claim 3 wherein said wet type multidisk clutch further comprises a friction disk mechanism and is housed in a clutch case.

5. A frame type tractor as claimed in claim 4 wherein said oil pump and said clutch case interpose a space therebetween surrounded by a clutch case lid member to define an oil chamber, the input shaft being supported by said clutch case lid member and carrying a lubricating oil pump on a portion thereof located in the oil chamber, and a lubricating oil passage being provided to supply oil from the oil chamber to said friction disk mechanism passing through the clutch output member.

6. A frame type tractor as claimed in claim 5, wherein said engine is mounted on the body frame through vibration absorbing means.

7. A frame type tractor comprising at least one pair of drive wheels, a body frame, an engine mounted on a forward region of the body frame, a transmission shaft connected at an end thereof to an output shaft of the engine, and a transmission mounted on a rear region of the body frame, said transmission having an input section including an input shaft connected to the other end of the transmission shaft and a wet type multidisk clutch for establishing and breaking transmission of a drive received from the transmission shaft through the input shaft, said wet type multidisk clutch comprises a main clutch body and a clutch case housing, the main clutch body including a clutch housing defining a clutch input section, a clutch output shaft, and a friction disk mechanism, a change speed section for changing a speed of the drive received from the input section, and an output section for transmitting the drive received from the change speed section to the drive wheels, said input section further includes an oil pump driven by the input shaft, and said oil pump and said clutch case define a space therebetween surrounded by a clutch case lid member to provide an oil chamber, said input shaft being supported by the clutch case lid member and carrying a lubricating oil pump on a portion thereof located in the oil chamber, and a lubricating oil passage being provided to supply oil from the oil chamber to the friction disk mechanism through the clutch output shaft.

8. A frame type tractor as claimed in claim 7 wherein said engine is mounted on the body frame through vibration absorbing means.

* * * * *